Sept. 1, 1959 A. E. SARSON 2,902,540

TELEVISION, TELE-CINEMATOGRAPH AND LIKE APPARATUS

Filed March 11, 1954 2 Sheets-Sheet 1

Inventor:
Alan Elmer Sarson
By his attorneys:
Baldwin & Wight

Sept. 1, 1959 A. E. SARSON 2,902,540

TELEVISION, TELE-CINEMATOGRAPH AND LIKE APPARATUS

Filed March 11, 1954 2 Sheets-Sheet 2

Inventor:
Alan Elmer Sarson
By his attorneys:
Baldwin & Wight

United States Patent Office 2,902,540

Patented Sept. 1, 1959

2,902,540

TELEVISION, TELE-CINEMATOGRAPH AND LIKE APPARATUS

Alan Elmer Sarson, Chelmsford, England, assignor to Marconi's Wireless Telegraph Company Limited, London, England, a British company Application March 11, 1954, Serial No. 415,617

Claims priority, application Great Britain March 12, 1953

4 Claims. (Cl. 178—6.8)

Figure 1:
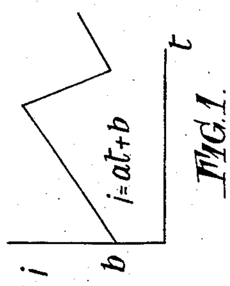

This invention relates to television, tele-cinematograph and like apparatus and more specifically to such apparatus employing so-called spot wobbling.

There are certain known television and like systems wherein scanning is effected by a flying spot which is subjected not only to the customary scanning line and field deflections but also to a supplementary deflection, at a frequency which is high in relation to the scanning line frequency, in the field deflection direction so that the spot does not scan the picture area in a series of simple straight lines but "wobbles" at high speed in a direction transverse to the line direction during each line. This supplementary deflection is known as "spot wobbling" and may be effected in accordance with various different pre-determined wave forms e.g. sinusoidal or rectangular. There are numerous systems using spot-wobbling for various purposes in connection with television transmission, television reception or recording of television pictures on film. Since the present invention is not concerned with spot-wobbling per se but only with the satisfaction of a requirement which arises in a good many spot wobbled systems, the said systems, which are known per se, will not be described herein.

One of the difficulties encountered in many spot wobbled systems is that, owing to non-linearity in the usual time base generator providing field deflection, the spacing between successive scanning lines in a field does not remain constant but varies during the field. By the expression "spacing between scanning lines" as here employed, is meant the spacing between the mean paths of the spot during successive line deflections i.e. the spacing between the successive straight lines which would be traced were the spot not wobbled. Unsatisfactory operation has been found to occur in a number of spot-wobbled systems from this cause, for, in known spot wobbled systems although the spacing between scanning lines may, for unavoidable reasons, vary during each field, the amplitude of the wobble remains constant. To take a typical example, if in a given known spot wobbled system, it is required to wobble the spot between two successive scanning lines, extending to both of them without extending to a further line, this requirement will not be satisfied if the spacing between scanning lines varies. The present invention seeks to overcome this defect and provide improved spot wobbled systems which are not liable to be rendered unsatisfactory in operation by unavoilable variations, during each field, of scanning line spacing.

An object of the present invention is to provide a spot-wobbled television or like system which comprises means for modulating the amplitude of the spot wobbling deflecting force in dependence upon the first differential with time, of the field deflecting force.

This and other objects are achieved according to this invention by a method of spot wobbling which comprises picking up a voltage from the spot wobbling coil and utilizing a component that is proportional to the rate of change of field coil current for amplitude modulating the spot wobble generator. The modulated spot wobble voltage is then used for wobbling the scanning spot and by this means the envelope of the spot wobble wave form is made to follow the scanning line variation.

Figure 2:
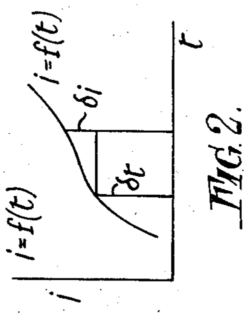
Figure 3:
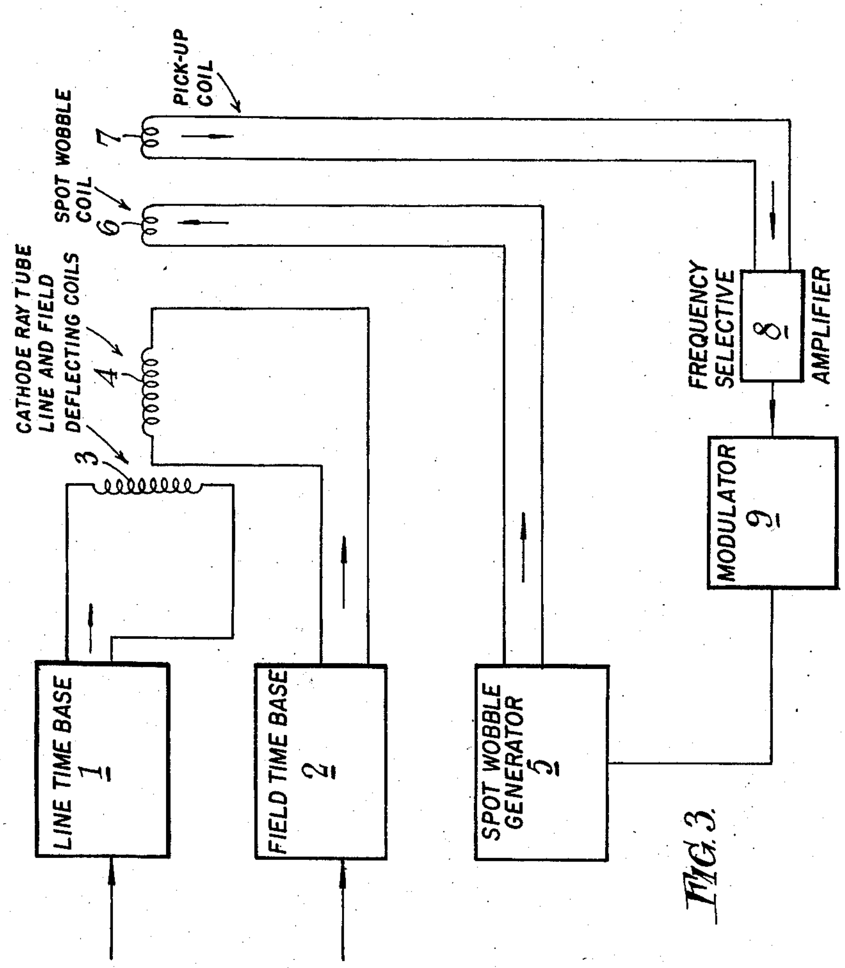
Figure 4:
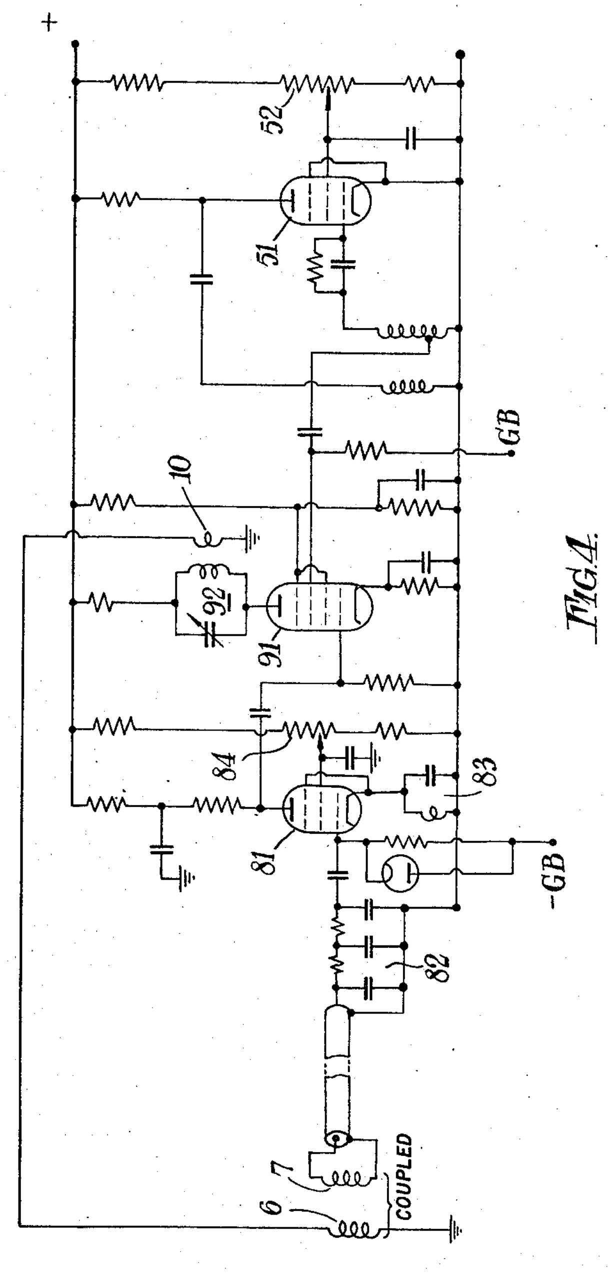

The invention is illustrated in and further explained in connection with the accompanying drawings, in which Figures 1 and 2 are explanatory graphical figures; Fig. 3 is a block diagram of one embodiment of the invention; and Fig. 4 is a simplified circuit diagram of part of an embodiment of the general nature of that of Fig. 3.

The "ideal" current wave form through the field deflection coils of a television cathode ray tube is a straight sided saw tooth as shown in Fig. 1 in which coil current $i$ is plotted against time $t$, the law of the "stroke" part of the wave—the part of lesser slope, the other being the "fly-back" part—being $$i=at+b$$

where $a$ and $b$ are constants. In practice, however, this "ideal" wave form is seldom if ever attainable and the "stroke" part of the wave—for present purposes the "fly-back" part is ignored—is non-linear being differently curved in different parts. Fig. 2 shows, in the same manner as Fig. 1, a typical stroke as obtained in practice. The scanning lines in the raster occur at time intervals $\delta t$ which may be assumed to be constant and thus the spacing of the lines is always proportional to $\delta i$.

Now $$i=f(t)$$

therefore $$\delta i=f'(a)\delta t$$

and since $\delta t$ is constant $$\delta i=\text{constant } f'(t)$$

If, therefore, in accordance with this invention, the spot wobble wave form is amplitude modulated by the first derivative—first differential with respect to time—of the field deflecting coil current the envelope of that wave form can be made to follow the variations of scanning line spacing and thus the defects which occur in known spot wobbled systems as a result of such variations will be avoided. It should be noted that the advantages of the invention are still obtained even in the presence of externally applied corrections or geometrical distortion such as that known as "pincushion"—"pincushion" is the distortion which arises from scanning a plane surface by a beam having its center of deflection at a finite distance from said plane and is directly analogous to the case of optical image formation by a lens—for such corrections and distortion affect field deflection and wobble deflection alike.

Fig. 3 is a block diagram of one embodiment of the invention. In this Figs. 1 and 2 are respectively, the usual line and field time base deflection wave sources and 3 and 4 represent, respectively the associated, mutually perpendicular line and field deflection coils. 5 is a spot wobble generator supplying the wobble wave form to a small coil 6 which is coaxial with the coil 4 and serves to wobble the spot. As so far described the system is well known. There is provided a further coil 7, herein termed the pick-up coil which is coaxial with the wobble coil 6 and is connected to the input terminals of a frequency selective amplifier 8. The output from the pick-up coil 7 will include a voltage of spot-wobble frequency and a component proportional to the rate of change of current in the field coil 4. The former is removed by a low pass filter incorporated in the amplifier 8 and the latter—the component proportional to the rate of change of field coil current—is, after suitable amplification at 8, applied to control a modulator 9 which modulates, in dependence thereon, the amplitude of the output fed from the oscillator 5 to the wobble coil 6. Although separate coils 6 and 7 are shown they could, if desired, be combined in a single coil performing both functions, i.e. wobbling the spot and providing the required input to amplifier 8.

Fig. 4 shows, in more detail, a preferred circuitry for use in an arrangement as shown generally in Fig. 3, it being assumed that the spot wobble current wave form is to be substantially sinusoidal and modulated in amplitude in accordance with the invention. In Fig. 4, the coil 6 is the spot wobble coil and 7 the pick-up coil. The coil 7 feeds into the control grid of an amplifying valve 81 through a low pass filter 82 the cathode circuit of the valve containing a further wobble frequency rejector circuit 83. Amplitude control of the signal proportional to rate of change of current in the field coil (not shown in Fig. 4) which appears at the anode of valve 81 is effected by means of the potentiometer 84 whereby the voltage on the second grid of the valve 81 may be adjusted. The spot wobble oscillator comprises a valve 51 connected in well known way as an oscillator and whose output can be adjusted by means of a potentiometer 52 controlling the voltage applied to the second grid. The outputs from the valves 81 and 51 are applied respectively to the first and third grids (the two signal grids) of a hexode valve 91 which has in its anode circuit a tuned circuit 92 resonant at the spot wobble frequency. A coil 10, coupled to circuit 92 is connected in series with the spot wobble coil 6 and accordingly the required amplitude modulated wave form will appear in coil 6. This coil should preferably be of small inductance relative to coil 10.

In many applications of the invention the operative movement of the scanning spot is uni-directional, the spot being blacked out during fly-back periods. In some cases, however, it may be required to modulate the wobble amplitude during both forward and return field deflections. This is easily achieved when required, for example, by applying the first differential signal component derived from the pick-up coil 7 (Fig. 3) to the modulator 9 through a full wave rectifier.

It will be observed that the invention does not depend upon the selection of any particular wave form for the spot wobble current, which need not be sinusoidal.

While I have described my invention in one of its preferred embodiments, I realize that modifications may be made and I desire that it be understood that no limitations upon my invention are intended other than may be imposed by the scope of the appended claims.

I claim:

1. In a television or like system, a cathode ray beam control system comprising mutually perpendicular line and field deflection electromagnetic means, a spot wobble coil disposed in the electromagnetic field of said means, a spot wobble generator connected with said coil, a pickup coil coupled with the spot wobble coil for picking up signals which are proportional to the rate of change of current in said field deflection means, a filter adapted to remove components of spot wobble frequency from said signals, an amplifier for amplifying said signals and a modulator for modulating the amplitude of the output from the spot wobble generator in dependence upon said filtered amplified signals.

2. A system as set forth in claim 1, wherein the pickup coil is co-axial with said spot wobble coil and said field deflection means, and is arranged to feed its output to a filter adapted to remove signals at spot wobble frequency and to pass components proportional to the rate of change of current in the field deflection means, said modulator being connected to receive the output from the filter.

3. A television or the like system as set forth in claim 1 in which said field deflection electromagnetic means is constituted by an electro-magnetic coil which is coaxial with said spot wobble coil and said pickup coil.

4. A television or the like system as set forth in claim 1 in which said perpendicular line and field electromagnetic deflection means are each constituted by electromagnetic coils and wherein said spot wobble coil and said pickup coil are both coaxial with the electro-magnetic coil constituting said field electromagnetic deflection means.

References Cited in the file of this patent

UNITED STATES PATENTS

| | | |
|---|---|---|
| 2,623,196 | Toulon | Dec. 23, 1952 |
| 2,671,129 | Moore | Mar. 2, 1954 |
| 2,676,200 | Sziklai | Apr. 20, 1954 |
| 2,691,743 | Urtel | Oct. 12, 1954 |
| 2,722,627 | Pappas | Nov. 1, 1955 |